(12) United States Patent
Valant

(10) Patent No.: US 10,906,805 B2
(45) Date of Patent: Feb. 2, 2021

(54) METHOD FOR STORING ELECTRICAL ENERGY IN SOLID MATTER

(71) Applicant: Institute Ces, Institut Znanosti In Tehnologije, d.o.o., Smarjeske Toplice (SI)

(72) Inventor: Matjaz Valant, Ljubljana (SI)

(73) Assignee: Institute Ces, Institut Znanosti In Technologije, d.o.o., Smarjeske Toplice (SI)

( * ) Notice: Subject to any disclaimer, the term of this patent is extended or adjusted under 35 U.S.C. 154(b) by 0 days.

(21) Appl. No.: 16/772,772

(22) PCT Filed: Sep. 18, 2018

(86) PCT No.: PCT/SI2018/050030
§ 371 (c)(1),
(2) Date: Jun. 13, 2020

(87) PCT Pub. No.: WO2019/117818
PCT Pub. Date: Jun. 20, 2019

(65) Prior Publication Data
US 2020/0308715 A1   Oct. 1, 2020

(30) Foreign Application Priority Data
Dec. 13, 2017  (SI) .................................. 2017003332

(51) Int. Cl.
*C01B 3/08* (2006.01)
*C25B 1/02* (2006.01)
(Continued)

(52) U.S. Cl.
CPC .................. *C01B 3/08* (2013.01); *C25B 1/02* (2013.01); *C25B 1/26* (2013.01); *H01M 8/0656* (2013.01)

(58) Field of Classification Search
CPC .................................... C01B 3/08; C25B 1/26
See application file for complete search history.

(56) References Cited

U.S. PATENT DOCUMENTS

| 3,996,064 | A | 12/1976 | Thaller |
| 4,502,928 | A | 3/1985 | Umetani |
(Continued)

OTHER PUBLICATIONS

Sukhvinder P.S. Badwal et al: "Emerging Electrochemical Energy Conversion and Storage Technologies", Frontiers in Chemistry, vol. 2, Sep. 24, 2014 (Sep. 24, 2014).

*Primary Examiner* — Nicholas A Smith
(74) *Attorney, Agent, or Firm* — The Watson IP Group, PLC; Jovan N. Jovanovic

(57) ABSTRACT

The method includes two technological segments (i) a reduction segment and (ii) an oxidation segment that are interconnected by various support technological processes for the regeneration of solutions and gases and heat recuperation. The reduction segment includes an electrolysis that is performed from a solution of chloride salts of an energy carrier. During the electrolysis, these elements reduce to a lower oxidation state, solidify on the electrodes or precipitate to a solid state. The solid substance thus obtained is the energy carrier that can be stored outside of the electrolyser until a need for additional energy emerges. During the electrolysis, chlorine gas develops that is collected and dissolved in water. An HCl solution is regenerated, which is used in the oxidation segment. Oxygen is released in this process. The energy that has thus been stored in the oxidation potential of the energy carrier is released during a spontaneous chemical reaction between the energy carrier and the HCl solution in the oxidation segment. In this chemical reaction, the oxidation state of the chemical elements which constitute the energy carrier is increased to an oxidation state identical to that from before the beginning of (Continued)

Figure 1:
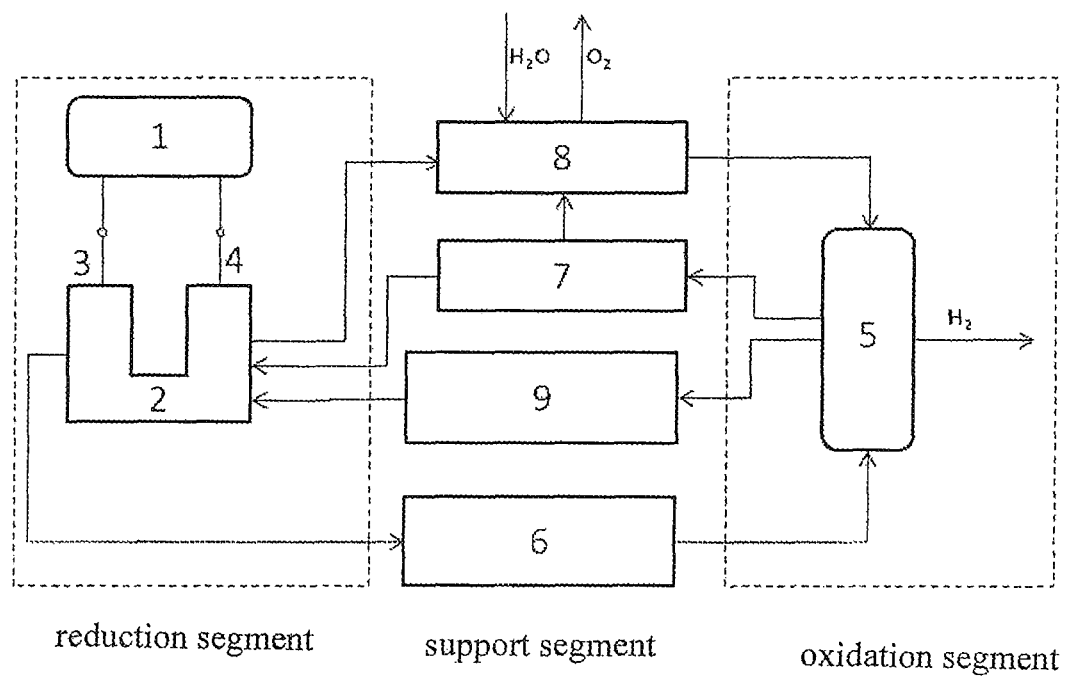

reduction segment    support segment    oxidation segment the electrolysis. The reaction product hydrogen is formed that represents a high calorific fuel. This fuel can be immediately converted to heat or electrical energy, without a need for intermediate storage, by known methods. Only water enters the entire method, oxygen and hydrogen leave, while the cycle is closed/cyclic for the remaining substances.

12 Claims, 2 Drawing Sheets

(51) Int. Cl.
*H01M 8/0656* (2016.01)
*C25B 1/26* (2006.01)

(56) References Cited

U.S. PATENT DOCUMENTS

| | | | |
|---|---|---|---|
| 4,534,833 A | | 8/1985 | Carr |
| 4,988,486 A | * | 1/1991 | Harris ............... B01J 8/0492 |
| | | | 422/605 |
| 8,617,766 B2 | * | 12/2013 | Bienvenu ............... C25B 5/00 |
| | | | 429/498 |
| 2017/0321332 A1 | * | 11/2017 | Gupta ............... C25B 15/08 |

* cited by examiner reduction segment　　support segment　　oxidation segment

METHOD FOR STORING ELECTRICAL ENERGY IN SOLID MATTER

OBJECT OF INVENTION

The present invention refers to a new method for storing electrical energy in a solid matter. The method is based on reduction of atoms of metals in an electrical energy storage segment and on their oxidation in an energy release segment.

PRIOR ART

Since the share of electrical energy obtained from inconstant sources has increased in the electricity grid, there is a growing need for storing sporadic surpluses of produced electrical energy. Inconstant production sources are the sources, in which the amount of produced electrical energy fluctuates in dependence on weather conditions (wind power and solar energy), time of the day (tide, solar energy) or season (solar thermal energy, hydropower). Electrical energy is stored in the period when its production exceeds consumption and is added to the grid when the consumption exceeds production. Such regulation of power in the electric grid is essential to preserve its stability and to prevent the grid from collapsing. The systems lacking possibilities of storing surplus electrical energy must have the production and consumption regulated through a decrease and increase in the production of electrical energy in power plants burning fuels, such as gas, oil, charcoal and nuclear fuel. This is a demanding process that reduces the power output and the economic viability of these power plants.

More important technologies used for storing the surplus electrical energy from the grid are pumped-storage power plants, storage in various types of batteries, storage in the form of compressed or liquefied air which may be expanded, storage in supercapacitors, or in the form of the mechanical energy of flywheels, heat or chemical energy. The electrical energy is stored in the form of chemical energy in a way to be used for the synthesis of compounds having high energy value, such as hydrogen, methane, methanol and hydrocarbons.

Of all chemical storage ways, hydrogen storage is currently technologically and economically the most suitable. In this method, the surplus electrical energy is used to produce hydrogen by the electrolysis of water. Hydrogen has a very low volume energy density, this is why it is mostly stored compressed or liquefied; this process is very demanding in terms of energy. Moreover, due to its high diffusivity, hydrogen escapes through the walls of storing containers, which in turn reduces the energy yield if the hydrogen is stored for a longer period of time. The chemical energy of hydrogen is converted to electrical energy in fuel cells or through direct burning. The total efficiency of this cycle is relatively low and only reaches about 30%, wherein a 40% loss occurs in the electrolysis and 10% in the compression and storage of hydrogen. The efficiency of converting this hydrogen to electrical energy in fuel cells is about 50%. Despite having a low efficiency, such storage of electrical energy is economically comparable to the storage in batteries due to a series of comparative advantages, such as lower material costs, higher density of the stored energy, and slow discharge. A further improvement in the overall economy of the storage of the surplus electrical energy in the form of hydrogen is based on the improvements of the above-mentioned parameters and in the increase in the efficiency and the decrease in the energy losses in individual segments of this technology.

Storage of electrical energy in solid matter is limited to some variants of batteries, in which the energy is stored in the form of an ionic gradient between an anode and a cathode, and capacitors and supercapacitors, in which the energy is stored in the form of the electric charge gradient. Only few methods for electrical energy storage in an oxidation potential of a solid substance have been described to date. The fundamental principle includes the method of electrolysis, with which the oxidation potential of a solid substance that is used as a carrier of the stored electrical energy is increased (hereinafter: energy carrier). This solid substance can be stored for as long as desired and, in the event of a need for the energy, this oxidation potential is released and used for obtaining a gaseous energy carrier (hereinafter: fuel), such as hydrogen, methane, etc., by reduction. Such fuels can be directly, without an intermediate storage, used to obtain heat or electrical energy.

Schaefer and Hemmer[i] described a method for storing surplus electrical energy by electrolytic reduction of a melt of alkali and alkaline earth hydroxides. During the electrolysis, corresponding metallic elements are produced that are stored as energy carriers. When the energy is to be released, hydroxides and hydrogen are produced in a reaction with water. A similar method for storing surplus electrical energy had been described long before that by Lagana et al.[ii] A difficulty of such an approach lies in the fact that all alkali and alkaline earth metals are very reactive and dangerous and must therefore be stored immersed in mineral oil or under a noble gas/hydrogen atmosphere. If they come in contact with moist air, they may ignite and cause an explosion and huge environmental damage. In addition to that, the electrolysis is carried out in a melt of hydroxides, i. e. at very elevated temperatures. To this purpose, part of the system must be constantly maintained at a high temperature and additional heat energy should be supplied, which in turn has a negative impact on the overall energy efficiency of this process.

Vogelmann[iii] described a method for electrical energy storage by electrolysis of a sodium chloride solution followed by amalgamation of sodium with mercury. When sodium and mercury are separated, sodium is stored and may be used in a reaction with water to obtain hydrogen. Sodium hydroxide is produced, which can be used to obtain carbon dioxide and the latter is converted to sodium carbonate. Sodium carbonate is the final product of this process. The process is not cyclic since sodium carbonate needs to be deposited. Moreover, as huge amounts of mercury are used and dangerous metallic sodium is stored, this process is environmentally unacceptable. The use of mercury is mostly legally prohibited.

DESCRIPTION OF INVENTION

The invention which is the object of this patent protection is a closed technological cycle with high energy efficiency that allows electrical energy storage in the form of a solid matter having a very high volume energy density. The method includes two main technological segments (i) a reduction segment and (ii) an oxidation segment that are interconnected by various support technological processes for the regeneration of solutions and gases, and heat recuperation.

Individual segments of the inventive method are known and have been described, yet never together in a technologically closed cycle and for the purpose disclosed by the present invention. Individual segments per se are not the object of this patent solution.

The reduction segment is represented by an electrolysis driven by the electrical energy to be stored. The electrolysis starts from a chloride salt solution at room temperature or a slightly elevated temperature that is below the boiling point of this solution. The solution contains ions of the chemical elements of the energy carrier in a higher oxidation state. During the electrolysis, these elements reduce to a lower oxidation state, solidify on the electrodes or precipitate to a solid state. The solid matter thus obtained is the energy carrier that can be stored outside of the electrolyser until a need for additional energy emerges. During the electrolysis, chlorine gas develops that is collected and dissolved in water. An HCl solution is regenerated, which is used in the oxidation segment. Oxygen is released in this process. The energy that has thus been stored in the oxidation potential of the energy carrier is released during a spontaneous chemical reaction between the energy carrier and the HCl solution in the oxidation segment of the method of the invention. In this chemical reaction, the oxidation state of the chemical elements which constitute the energy carrier is increased to an oxidation state identical to that from before the beginning of the electrolysis. The reaction product hydrogen is produced that represents a high calorific fuel. This fuel can be immediately converted to heat or electrical energy, without a need for intermediate storage, by known methods that are not the object of this patent protection. Only water enters the entire method, oxygen and hydrogen leave, while the cycle is closed/cyclic for the remaining substances.

In addition to the two technological segments described above, the method of the invention comprises a variety of support processes that contribute to the greatest possible yield of raw materials and energy. These technological processes provide for the regeneration of an electrolytic medium in the reduction segment and of the reaction medium in the oxidation segment, in some cases also for the preparation of an energy carrier for an oxidation reaction. The method of the invention further includes processes for the recuperation of the heat that can develop during a spontaneous oxidation reaction, in some cases also during the electrolysis, and can be consumed during the regeneration of raw materials. The planning of these support technological processes is specific depending on the chemistry of the oxidation and reduction segments.

The method of the invention will be described hereinbelow and is illustrated in the figures which show:

FIG. 1: General diagram of the method of the invention—a technological process of oxidation/reduction electrical energy storage in a solid substance FIG. 2: Diagram of the method of the invention—a technological process of electrical energy storage, wherein metallic iron is an energy carrier.

The first key segment, i. e. the reduction segment, is represented by the electrolytic reduction formation of a solid matter, i. e. energy carrier. In the reduction segment, from an electrolyte solution consisting of a chloride salt solution and an energy carrier, a reduction of energy carrier ions is performed at room temperature or at a slightly elevated temperature that is below the boiling point of this solution, until a solid energy carrier is formed. The preferred energy carriers are metals M (e. g. Fe, Pb, Zn, Cr, Sn, Co, Ni) or the alloys thereof (e. g. Zn—Fe alloys) or the intermetallic compounds thereof (e. g. $Fe_3Zn_{10}$, $FeZn_7$, $Fe_5Sn_3$, FeSn) which have a negative reduction potential, yet a less negative one than the reduction potential of the water. The most preferred energy carrier is Fe or Zn.

The reduction segment consists of an electrolyser 2 with a cathode 3 and an anode 4, where electrolysis is carried out with an electrical energy source 1. During the electrolysis, the energy carriers are reduced to a lower oxidation state, solidify on the electrodes or precipitate into a solid state. On the cathode 3, the ions of the energy carriers, e. g. the metallic ions $M^{2+}$ are reduced to a metal M, the gaseous chlorine ($Cl_2$) is produced on the anode side. These electrochemical reactions are given by the following chemical equations:

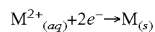 at the cathode:

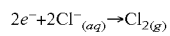 at the anode:

During the electrolysis, the metals M (e. g. Fe, Pb, Zn, Cr, Sn, Co, Ni) or the alloys thereof (e. g. Zn—Fe alloys) or the intermetallic compounds thereof (e. g. $Fe_3Zn_{10}$, $FeZn_7$, $Fe_5Sn_3$, FeSn) are formed which represent an energy carrier having a very high volume density and chemical stability.

The working parameters, the types of electrodes, electrolytic cells and electrolytes, and other electrolytic conditions are specific for individual electrolytic systems. The electrolytic conditions for the systems that are relevant for this invention have mainly already been researched and described. An example of such electrolysis is the electrolysis of nickel and iron chloride solutions, which was described by Tanimura et al.[iv] The energy efficiencies of these electrolytic methods reach 95% and more.

The obtained energy carrier, i. e. the reduced energy carrier, is stored in a storage 6 for subsequent energy release in the oxidation segment of the method of the invention. The energy carriers thus obtained are normally not very reactive and environmentally harmful, yet may slowly corrode. The energy carrier is preferably stored under an inert atmosphere of nitrogen independent on the corrosion properties of the energy carrier. Oxidation or any other surface reaction (e. g. with $CO_2$, $H_2O$ etc.) is herewith prevented. The reacted material will not subsequently react with HCl, which will result in material and consequently energy losses. The storage under an inert atmosphere of nitrogen prevents the loss of material and allows that the entire energy carrier is used for the release of energy and then returned to the cycle.

The second key segment of the method of the invention is the oxidation segment, wherein a chemical reaction occurs in a reaction vessel 5, in which the oxidation potential of the energy carrier is released and hydrogen is formed as fuel. The chemical reaction occurs between the HCl solution and the energy carrier (e. g. a metal having a general designation M) according to the reaction

To achieve a good efficiency of the method of the invention, it is important for the reaction to be thermodynamically spontaneous, which means that the Gibbs free energy gets reduced during the reaction. No additional energy needs to be supplied for the reaction to take place. In the reaction, energy is produced in the form of released heat that can be recuperated in a heat recuperator 7 and delivered to the regeneration process of the HCl solution to an electrolyte regenerator 8 and, if needed, also to the electrolysis, particularly to the electrolyser 2. The reactions relevant for this technological process have already been described and assessed in terms of thermodynamics, yet have never been used in the method that is the object of this patent protection.

Once the reaction is over, the metallic chloride reaction solution is optionally stored in acid-resistant tanks 9 or immediately introduced to a new electrolytic cycle.

The chlorine gas that develops on the anode during the electrolysis is conducted to commercially available gas scrubbers, wherein an HCl solution is formed again during a reaction with water. The reaction occurs in two stages as shown by the chemical equation $$2Cl_2+2H_2O \rightarrow 2HCl+2HClO \rightarrow 4HCl+O_2$$

The HClO that is produced in the first stage dissociates into HCl under the influence of light or heat. Water is introduced into the process; the oxygen gas exits it. The regenerated HCl solution is introduced into the oxidation segment, more precisely into the reaction vessel, for a reaction with the energy carrier.

Figure 2:
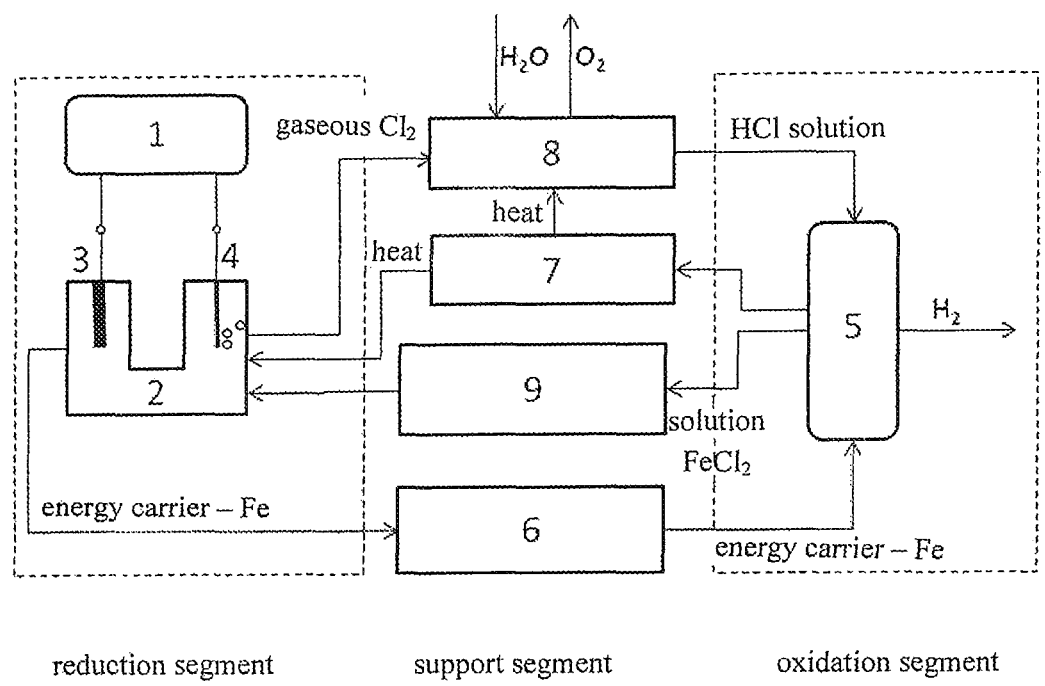

An embodiment of the method of the invention is described hereinbelow, wherein metallic iron is the energy carrier. An example of the method of the invention, i. e. a chloride cycle for storing surplus electrical energy in a solid substance, is oxidation and reduction of iron and is shown in FIG. 2. In the reduction segment, the $FeCl_2$ solution is electrolysed in the electrolyser 2, in which the cathode part is separated from the anode part by an ion-permeable membrane. In the cathode part, the iron ions ($Fe^{2+}$) on the cathode 3 are reduced to the metallic iron (Fe), while gaseous chlorine ($Cl_2$) is produced on the anode side. These electrochemical reactions are illustrated by the following chemical equations:

$$Fe^{2+}_{(aq)}+2e^- \rightarrow Fe_{(s)} \quad \text{at the cathode:}$$

$$2e^-+2Cl^-_{(aq)} \rightarrow Cl_{2(g)} \quad \text{at the anode:}$$

When the electrolytic process is over, the iron is the energy carrier and can be stored in the storage 6. The leaving gaseous chlorine is collected in the process of electrolyte regeneration and dissolved in the water which is supplied to the system, in which the HCl solution and the gaseous $O_2$ are produced. The process is conducted in the electrolyte regenerator 8. The HCl solution is conducted to the oxidation segment. When a need for energy emerges, the stored iron is subject to a reaction with the HCl solution in the reaction vessel 5 in the oxidation segment. In the reaction, $Fe_2Cl$ and hydrogen are produced according to the equation:

$$Fe_{(s)}+2HCl_{(aq)} \rightarrow FeCl_{2(aq)}+H_{2(g)}$$

The energy in the reaction is produced in the form of released heat which can be recuperated in the heat recuperator 7 and supplied to the regeneration process of the HCl solution in the electrolyte regenerator 8 and optionally to electrolysis in the electrolyser 2.

The $FeCl_2$ solution is stored in acid-resistant tanks 9 and is re-used for the electrolysis of surplus electrical energy. In the oxidation segment one mole of $H_2$ gas is obtained per each mole of Fe. On this basis, it can be calculated that the volume energy density in the iron as the energy carrier in this chloride oxidation-reduction process is 11.20 kWh/l, which is considerably more than the volume energy density of the currently used energy carriers. The gaseous hydrogen has the volume energy density of 0.0018 kWh/l, hydrogen compressed to 700 bar 1.55 kWh/l, liquefied hydrogen 2.81 kWh/l, hydrogen stored in metallic hydrides 3.18 kWh/l. It also exceeds the values of liquid fossil fuels such as diesel (9.94 kWh/l) or even kerosene (10.38 kWh/l).

This invention is not obvious with respect to the prior art and is innovative because processes have been included in the technological cycle of electrical energy storage in a solid matter that have not been described before:

new chemistry on the basis of oxidation-reduction conversion of metallic chlorides performance of electrolysis at low temperatures from a solution production of an energy carrier having a very high volume density that is chemically stable and ecologically unharmful.

This invention is useful since it allows a sustainable storage of huge electrical energy surpluses from the electric grids in a long period of time. The method of the invention has high energy yields and almost zero loss discharge over time. The method is environmentally friendly because the substance cycle of the method is closed, no material deposits or harmful emissions are produced since the entire material circles within the process. Only water enters the process, while hydrogen and oxygen leave the process. A further benefit of the invention is the fact that the energy carriers have very high volume energy densities that even exceed the volume energy density of kerosene. It is herewith allowed that a huge amount of stored energy is stored in a relatively small volume.

REFERENCES

[i] E. Schaefer, K. Hemmer, Storage of solar-, wind- or water energy by electrolysis of metal hydroxide—by supplying hydroxide of e.g. lithium, sodium, potassium etc. to electrolysis cell and passing current through cell, with additional heat supply, DE19523939 (A1) (1997).

[ii] V. Lagana, F. Saviano, G Fusco, Process for the storage of electrical energy by electrolysis of alkali metal hydroxides, IL60167 (A) (1983).

[iii] M. Vogelmann, Combined chemical and physical process useful in the field of storage of electrical energy and carbon dioxide, comprises carrying out melt flow electrolysis of sodium chloride for extracting metallic sodium and gaseous chloride, DE10200900775 (A1) (2010).

[iv] Y. Tanimura, T. Itoh, M. Kato. Y. Mikami, Electrolytic regeneration of Iron (III) Chloride Etchant II. Continuous Electrolysis, Denki Kagaku vol. 64, pp. 301-306 (1996)

The invention claimed is:

1. A method for storing electrical energy in a solid matter, characterised by comprising: (i) carrying out an electrolysis with an electrical energy source (1) in a reduction segment comprising of an electrolyser (2) with a cathode (3) and an anode (4), wherein from an electrolyte solution, which is a solution of an energy carrier chloride salt, a reduction of the energy carrier ions is carried out until a solid energy carrier is produced, which has a very high volume energy density and is chemically stable, wherein a chlorine gas is produced, and (ii) performing a chemical reaction in an oxidation segment that includes a reaction vessel (5) with an HCl solution, wherein the chemical reaction occurs in the reaction vessel between the solid energy carrier obtained in the reduction segment and the HCl solution, wherein heat, a chloride salt solution of the energy carrier, and hydrogen are produced.

2. Method according to claim 1, characterised in that the hydrogen produced in the oxidation segment is used in fuel cells for generating electrical energy or as fuel for producing heat energy.

3. Method according to claim 1, characterised in that the electrolysis is carried out at room temperature or at a slightly elevated temperature that is below the boiling point of the electrolyte solution.

4. Method according to claim 1, characterised in that the solid energy carrier is stored in a storage (6) for subsequent release of an energy in the oxidation segment.

5. Method according to claim 1, characterised in that an energy in the reaction carried out in the oxidation segment is produced in the form of released heat that is recuperated in a heat recuperator (7) and supplied to a regeneration process of the HCl solution in an electrolyte regenerator (8) and optionally to the electrolysis in the electrolyser (2).

6. Method according to claim 1, characterised in that the reaction chloride salt solution of the energy carrier is optionally stored in acid-resistant tanks (9) or is immediately introduced into a new electrolytic cycle.

7. Method according to claim 1, characterised in that the chlorine gas that develops on the anode (4) during the electrolysis is conducted to an electrolyte regenerator (8), wherein an HCl solution is produced again during a reaction with water, and the regenerated HCl solution is introduced in the oxidation segment, more precisely into the reaction vessel (5) for the reaction with the energy carrier.

8. Method according to claim 1, characterised in that only water enters the method, oxygen and hydrogen leave, while the method is a cycle that is closed/cyclic for the remaining substances.

9. Method according to claim 1, characterised in that the energy carriers is one or more metals selected from Fe, Pb, Zn, Cr, Sn, Co, Ni, the alloys thereof or the intermetallic compounds thereof which have a negative reduction potential, yet a less negative reduction potential than the reduction potential of the water.

10. Method according to claim 1, characterised in that the energy carrier is Fe or Zn.

11. Method according to claim 1, characterised in that in the reduction segment, a $FeCl_2$ solution is electrolysed in the electrolyser (2), in which the cathode part is separated from the anode part by an ion-permeable membrane, wherein the iron ions $Fe^{2+}$ on the cathode (3) are reduced to ametallic iron Fe, while gaseous chlorine 012 is produced on the anode side; when the electrolysis is over, the metallic iron Fe is the energy carrier and can be stored in the storage (6) under an atmosphere of nitrogen; the leaving gaseous chlorine is collected in a process of electrolyte regeneration in the electrolyte regenerator (8) and dissolved in water which is supplied to the method, wherein the HCl solution, which is returned to the reaction vessel (5) of the oxidation segment, and the gaseous $O_2$ are produced; when a need for energy emerges, the stored metallic iron Fe in the oxidation segment of the method is subject to the reaction with the HCl solution, wherein $FeCl_2$ and hydrogen are produced, which hydrogen is subsequently used as fuel and the obtained $FeCl_2$ solution is stored and re-used for the electrolysis in the reduction segment.

12. Method according to claim 11, characterised in that the energy density by volume in the iron as the energy carrier is higher than that of currently used energy carriers intended for storing electrical energy and amounts to 11.20 kWh/l.

\* \* \* \* \*